United States Patent
Lim et al.

(10) Patent No.: US 8,810,744 B2
(45) Date of Patent: Aug. 19, 2014

(54) LIQUID CRYSTAL DISPLAY PANEL AND MANUFACTURING METHOD THEREOF

(75) Inventors: Dong-Hun Lim, Yongin (KR); Min-Woo Kim, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 570 days.

(21) Appl. No.: 12/970,608

(22) Filed: Dec. 16, 2010

(65) Prior Publication Data
US 2011/0170043 A1 Jul. 14, 2011

(30) Foreign Application Priority Data
Jan. 8, 2010 (KR) .................. 10-2010-0001979

(51) Int. Cl.
*G02F 1/133* (2006.01)
*G02F 1/1335* (2006.01)
*G02F 1/1345* (2006.01)

(52) U.S. Cl.
CPC ...... *G02F 1/133512* (2013.01); *G02F 1/13452* (2013.01)
USPC ............................................. 349/40; 349/44

(58) Field of Classification Search
CPC .................... H01L 27/1214; G02F 1/134363; G02F 1/136204
USPC ............. 349/44, 29, 116, 139, 33–37; 359/70
See application file for complete search history.

(56) References Cited

U.S. PATENT DOCUMENTS 5,760,855 A * 6/1998 Nakase et al. .................. 349/40
(Continued)

FOREIGN PATENT DOCUMENTS

| CN | 101435957 A | | 5/2009 | |
| JP | 04-133032 | * | 5/1992 | .............. G02F 1/136 |

(Continued)

OTHER PUBLICATIONS

The First Office Action issued by the Chinese Patent Office dated Jun. 5, 2013 in connection to the Chinese Patent Application serial No. 201110006022.5, which corresponds to the Korean Patent Application No. 10-2010-0001979 with its full English translation, that cited and interpreted CN101435957A.

*Primary Examiner* — Edward Glick
*Assistant Examiner* — Sang V Nguyen
(74) *Attorney, Agent, or Firm* — Robert E. Bushnell, Esq.

(57) ABSTRACT

A liquid crystal display panel is disclosed. The liquid crystal display panel includes: a first substrate with a conductive layer formed on one surface thereof; a color filter layer including a plurality of color filters formed on the conductive layer; a conductive light shielding layer formed between the plurality of color filters; a second substrate with a pixel array formed on one surface thereof; and a liquid crystal layer filled between the conductive light shielding layer and the pixel array, wherein the conductive layer is electrically short-circuited with the pixel array. Since a voltage is applied to the conductive layer formed on the front surface of the first substrate, liquid crystal molecules of the liquid crystal layer between the conductive layer and the pixel array can be prevented from being vertically aligned, thus improving liquid crystal efficiency.

11 Claims, 4 Drawing Sheets

(56) References Cited

U.S. PATENT DOCUMENTS

| | | | |
|---|---|---|---|
| 6,639,644 B1 * | 10/2003 | Tateno et al. | 349/155 |
| 6,927,825 B1 * | 8/2005 | Koma et al. | 349/133 |
| 8,045,109 B2 * | 10/2011 | Kondo et al. | 349/122 |
| 2002/0003597 A1 * | 1/2002 | Shin et al. | 349/110 |
| 2005/0190316 A1 * | 9/2005 | Takahashi et al. | 349/44 |
| 2005/0225692 A1 * | 10/2005 | Yanagawa et al. | 349/44 |
| 2006/0290862 A1 * | 12/2006 | Yanagawa et al. | 349/139 |
| 2007/0290972 A1 * | 12/2007 | Meredith | 345/90 |

FOREIGN PATENT DOCUMENTS

| | | | | |
|---|---|---|---|---|
| JP | 2008-197218 | * | 8/2008 | G02F 1/1345 |
| KR | 1020070072134 A | | 7/2007 | |
| KR | 1020070121126 A | | 12/2007 | |
| KR | 1020080077831 A | | 8/2008 | |
| KR | 1020090010318 A | | 1/2009 | |
| KR | 1020090049981 A | | 5/2009 | |

* cited by examiner

LIQUID CRYSTAL DISPLAY PANEL AND MANUFACTURING METHOD THEREOF

CLAIM OF PRIORITY

This application claims priority to and the benefit of Korean Patent Application No. 10-2010-0001979 filed in the Korean Intellectual Property Office on Jan. 8, 2010, the entire contents of which are incorporated herein by reference.

BACKGROUND OF THE INVENTION

1. Field of the Invention

The present invention relates to a liquid crystal display panel and manufacturing method thereof, and more particularly, to a liquid crystal display panel that is capable of preventing a vertical field due to static electricity with a simple configuration by positioning ITO within a color filter and applying an internal voltage and a threshold voltage, and a manufacturing method thereof.

2. Description of the Related Art

In general, a liquid crystal display (LCD) displays an image corresponding to a video signal on a liquid crystal display panel, on which liquid crystal cells are arranged in a matrix form, by adjusting light transmittance of the liquid crystal cells according to the video signal. To this end, the LCD includes the liquid crystal display panel including liquid crystal cells arranged in an active matrix form, and driving circuits for driving the liquid crystal display panel.

The LCD is classified into a twisted nematic (TN) mode LCD using a vertical field, and an in-plane switch (IPS) mode LCD using a horizontal field (or an in-plane field) depending on the direction of the electric field for driving liquid crystal molecules.

The TN mode LCD, in which liquid crystal molecules of a liquid crystal display panel are driven by a vertical field formed between pixel electrodes and a common electrode disposed to face each other on an upper substrate, advantageously has a large aperture ratio but disadvantageously has a small viewing angle.

The IPS mode LCD, in which liquid crystal molecules of a liquid crystal display panel are driven by a horizontal field between pixel electrodes and a common electrode disposed in parallel to each other on a lower substrate, advantageously has a large viewing angle but disadvantageously has a small aperture ratio.

Meanwhile, in the TN mode LCD, the liquid crystal molecules of the liquid crystal display panel are driven by a vertical field between a color filter array substrate and a thin film transistor (TFT) array substrate, allowing for the formation of an equal potential loop between the color filter array substrate and the TFT array substrate, so even a small amount of static electricity that is generated can be easily discharged compared with the IPS mode LCD.

In comparison, in the IPS mode LCD, because the liquid crystal molecules of the liquid crystal display panel are driven by a horizontal field, the color filter array substrate is electrically isolated, making it difficult to discharge static electricity. In an effort to solve the problem of the generation of static electricity, in the IPS mode LCD, a transparent metal layer is formed on a rear surface of the color filter array substrate of the liquid crystal panel to externally discharge static electricity.

However, in the related art LCD, because the transparent metal layer is formed at the outer side of the liquid crystal display panel, a problem arises in that an etching process for making the liquid crystal display panel thinner cannot be performed.

Namely, in general, after the formation of the liquid crystal display panel, the upper and lower substrates are partially etched through a wet etching process to reduce the thickness of the liquid crystal display panel. In this case, however, when forming the transparent metal layer at the outer side of the liquid crystal display panel, the process of making the liquid crystal display panel thinner, which includes a dipping process with an etching solution, cannot be performed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a liquid crystal display panel having an advantage of basically removing a vertical field due to static electricity.

The present invention has been also made in an effort to provide a liquid crystal display panel having an advantage of simplifying a manufacturing process to thus improve productivity and reduce cost.

An exemplary embodiment of the present invention provides a liquid crystal display panel including: a first substrate with a conductive layer formed on one surface thereof; a color filter layer including a plurality of color filters formed on the conductive layer; a conductive light shielding layer formed between the plurality of color filters; a second substrate with a pixel array formed on one surface thereof; and a liquid crystal layer filled between the conductive light shielding layer and the pixel array, wherein the conductive layer is electrically short-circuited with the pixel array.

The pixel array may include a thin film transistor (TFT), a pixel electrode, and a common electrode.

The liquid crystal display panel may further include an overcoat layer formed at a lower portion of the color filter layer.

A certain voltage may be applied to the conductive layer, and the difference between the voltage applied to the conductive layer and a voltage applied to the pixel array may be smaller than a threshold voltage that does not allow liquid crystal molecules of the liquid crystal layer to be vertically aligned. The conductive light shielding layer may contain a chromium (Cr) component.

The conductive layer may or may not have a pattern.

Voltage application wiring may be formed on the second substrate in order to apply a voltage to the conductive layer of the first substrate, and the voltage application wiring may be formed to be electrically short-circuited with wiring of is the pixel array.

A conductive connection part may be formed between the first and second substrates in order to electrically connect the voltage application wiring and the conductive layer.

The conductive connection part may include a sealing portion.

Another embodiment of the present invention provides a method for forming a liquid crystal display panel, including: providing a first substrate with a conductive layer formed on a front surface thereof; providing a second substrate with voltage application wiring formed thereon to apply a voltage to the conductive layer of the first substrate; attaching the first and second substrates; electrically connecting the conductive layer of the first substrate and the voltage application wiring of the second substrate; forming a liquid crystal layer between the first and second substrates; and applying a voltage to the conductive layer of the first substrate.

The providing of the first substrate may include forming a conductive layer on a front surface of the first substrate, forming a metal black matrix at an upper portion of the conductive layer, and forming a color filter layer on the metal black matrix.

The electrically connecting of the conductive layer of the first substrate and the voltage application wiring of the second substrate may include forming a conductive connection part between the first and second substrates.

The providing of the second substrate may include forming a pixel array on the second substrate.

The pixel array may be formed to be electrically short-circuited with the conductive layer.

The difference between a voltage applied to the conductive layer and a voltage applied to the pixel array may be smaller than a threshold voltage that does not allow liquid crystal molecules of the liquid crystal layer to be vertically aligned.

According to an exemplary embodiment of the present invention, because the conductive layer is formed on the front surface of the first substrate to remove static electricity, static electricity of the liquid crystal display panel can be prevented with a simple structure.

According to an exemplary embodiment of the present invention, because a certain voltage is applied to the conductive layer formed on the front surface of the first substrate, liquid crystal molecules of the liquid crystal layer between the conductive layer and the pixel array can be prevented from being vertically aligned, thus improving liquid crystal efficiency.

In the method of forming a liquid crystal display panel according to an exemplary embodiment of the present invention, because such a process of forming a conductive layer on a rear surface of the first substrate and grounding it from the exterior as in the related art is omitted, the manufacturing process of the liquid crystal display panel can be simplified and the productivity can be improved to lead to a reduction in production cost.

DETAILED DESCRIPTION OF THE EMBODIMENTS

The present invention will be described more fully hereinafter with reference to the accompanying drawings, in which exemplary embodiments of the invention are shown. In describing the present invention, a configuration required for understanding the technical ideas of the present invention will be mainly described, and a description of a configuration departing from the ideas of the present invention will be omitted. However, a skilled person in the art to which the present invention pertains will understand the technical scope of the ideas of the present invention. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
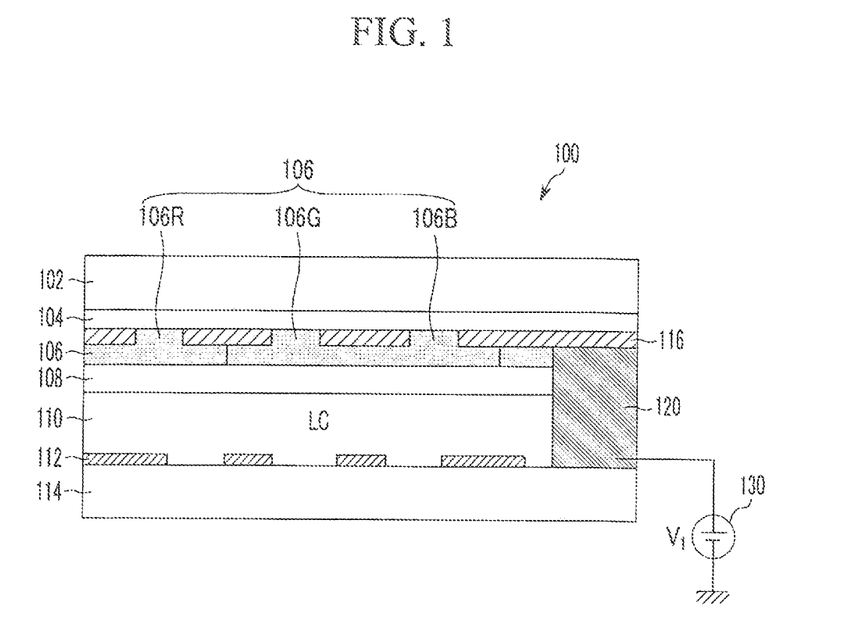
FIG. 1 is a cross-sectional view of a liquid crystal display panel according to an exemplary embodiment of the present invention.
Figure 2:
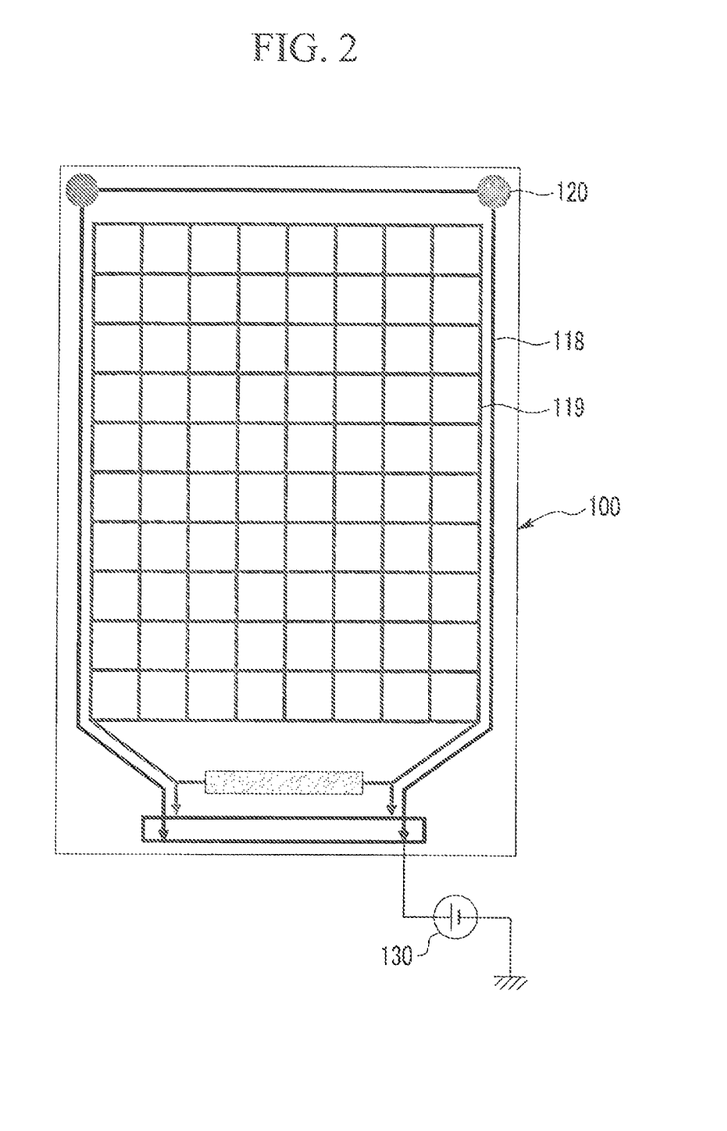
FIG. 2 is a top plan view showing a wiring structure on a second substrate of the liquid crystal display panel according to an exemplary embodiment of the present invention.
Figure 3:
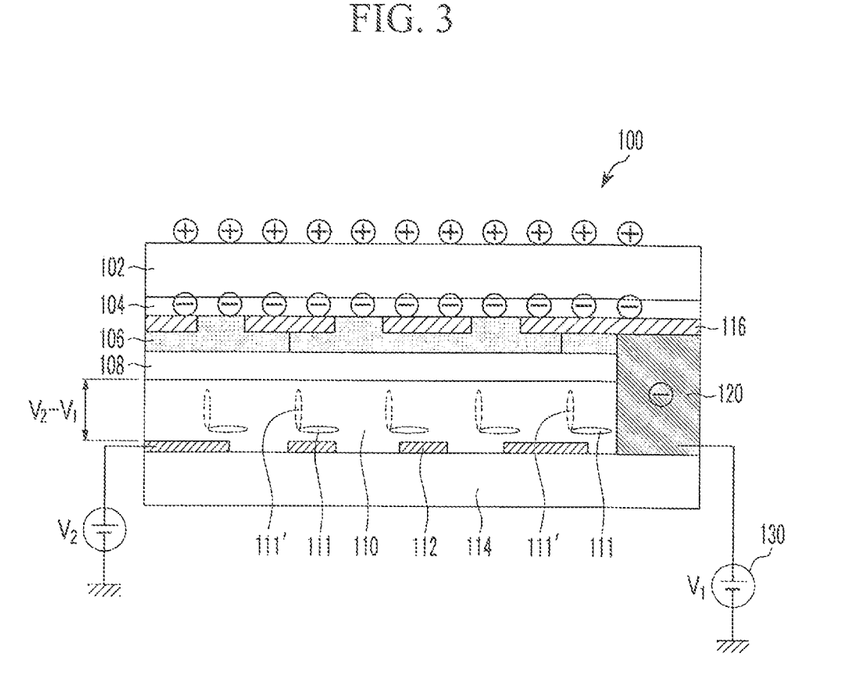
FIG. 3 is a cross-sectional view showing the difference of voltages formed between ITO and a pixel array in the liquid crystal display panel according to an exemplary embodiment of the present invention.

FIG. 1 is a cross-sectional view of a liquid crystal display panel according to an exemplary embodiment of the present invention, and FIG. 2 is a top plan view showing a wiring structure on a second substrate of the liquid crystal display panel according to an exemplary embodiment of the present invention. FIG. 3 illustrates a state in which liquid crystal molecules of a liquid crystal layer are horizontally or vertically aligned according to a voltage supplied to a pixel array of the second substrate and a conductive layer of a first substrate.

With reference to FIGS. 1 and 2, a liquid crystal display panel 100 is according to an exemplary embodiment of the present invention includes a first substrate 102, a conductive layer 104, a color filter layer 106, a conductive light shielding layer 116, a liquid crystal layer 110, a conductive connection part 120, and a second substrate 114.

The conductive layer 104 is formed on one surface of the first substrate 102. In this case, according to the present exemplary embodiment, the one surface of the first substrate 102 where the conductive layer 104 is formed faces the second substrate 114, which will be defined as a front surface of the first substrate 102 in the present exemplary embodiment.

The conductive layer 104 does not have a pattern.

When the conductive layer 104 is formed on one surface of the first substrate 102, it may be made of a transparent conductive metal such as indium tin oxide (ITO) or indium zinc oxide (IZO) having good light transmittance, or may be made of a transparent conductive resin. Here, the transparent conductive resin may be made of a mixture of ITO powder and an acryl, an epoxy, or the like. According to an exemplary embodiment of the present invention, the conductive layer 104 is formed at the interior of the liquid crystal display panel to discharge static electricity.

The conductive light shielding layer (or black matrix) 116 serves to absorb external light as well as prevent light leakage to thus increase the contrast. According to an exemplary embodiment of the present invention, the conductive light shielding layer 116 is formed to include a metal material, and in this case, the metal material may include chromium (Cr).

In the liquid crystal display panel according to the present exemplary embodiment, because the conductive layer 104 is connected by voltage application wiring 118 and the conductive connection part 120 formed on the second substrate 114 in order to discharge electrical charges from the conductive layer 104 disposed on the front surface of the first substrate 102, preferably, the light shielding layer 116 positioned between the conductive layer 104 and the conductive connection part 120 is formed to have conductivity.

Conductive light shielding layers 116 are formed at certain intervals on an upper portion of the conductive layer of the first substrate such that they overlap with a pixel array area, gate lines, and data lines of the second substrate 114. Also, the light shielding layers 116 demarcate red, green, and blue color filter layers 106R, 106G, and 106B formed on the light shielding layers 116.

The red, green, and blue color filter layers 106R, 106G, and 106B are formed to be alternately arranged between the conductive light shielding layers 116. Such color filter layers 106 may be made of a photosensitive organic material.

Meanwhile, in order to improve smoothness by removing a step generated due to the presence of the color filter layers 106, an overcoat layer 108 may be selectively formed.

A pixel array 112 including pixel electrodes and a transparent common electrode is formed on one surface of the second substrate 114.

Although not shown, each pixel area is defined by gate lines and data lines formed to cross each other in the pixel array 112.

A switching element is disposed at each crossing point of the gate lines and data lines. The pixel electrodes and transparent common electrode of the pixel array are separately disposed such that they overlap by a certain area with an insulating layer interposed therebetween, and are formed within a pixel area to adjust light transmittance by applying a voltage to the liquid crystal layer (LC) 110.

In an exemplary embodiment of the present invention, it is configured such that a reference voltage V2 is applied to the pixel array 112 from a certain voltage source. In this case, the reference voltage may be approximately 5V.

The conductive connection part 120 is formed between the first substrate 102 and the second substrate 114.

In more detail, at the first substrate 102 side, the conductive connection part 120 is electrically connected with the conductive layer 104 via the conductive light shielding layer 116, and at the second substrate 114 side, the conductive connection part 120 is electrically connected with the voltage application wiring 118 that supplies a voltage to the conductive layer 104 formed on the second substrate 114.

Meanwhile, according to an exemplary embodiment of the present invention, the conductive connection part 120 may be made of a sealing material.

Thus, in the liquid crystal display panel 100 according to the present exemplary embodiment, when static electricity is generated from the rear surface, namely, the upper surface, of the first substrate 102, positive (+) charges are arranged on the upper surface of the first substrate 102 and negative (−) charges are arranged on the conductive layer 104 positioned on the front surface of the first substrate 1, and then the negative (−) charges formed on the conductive layer 104 are externally discharged from the lower portion of the first substrate 102 through the conductive connection part 120. Accordingly, generation of static electricity from the surface of the liquid crystal display panel can be prevented.

As a result, in the liquid crystal display panel 100 according to the present exemplary embodiment, static electricity formed on the first substrate 102 can be eliminated without having to additionally form the conductive layer 104 on the rear surface of the first substrate 102 for external grounding.

Meanwhile, with reference to FIG. 2, according to an exemplary embodiment of the present invention, the voltage application wiring 118 that supplies a voltage to the conductive layer 104 positioned on the front surface of the first substrate 1 is formed on the second substrate 114 such that it is electrically short-circuited with driving wiring 119 of the pixel array 112 on the second substrate 114.

Also, it is configured such that a voltage V1 from a certain voltage source 130 is supplied to the conductive layer 104 of the first substrate 102, which is electrically short-circuited with the driving wiring 119 of the pixel array 112.

Thus, in the liquid crystal display panel 100 according to an exemplary embodiment of the present invention, the voltage V1 is supplied to the conductive layer 104 formed on the first substrate 102, and the voltage V2 is supplied to the pixel array 112 of the second substrate 114.

Accordingly, with reference to FIG. 3, there is a voltage difference of V2-V1 formed between the conductive layer 104 and the pixel array 112 of the second substrate 114. For example, when the voltage V1 applied to the conductive layer 104 is 1.5V and the voltage V2 applied to the pixel array 112 is 5V, a voltage difference in a vertical field formed at the liquid crystal layer 110 is 3.5V. If the voltage difference in the vertical field is large enough to vertically align liquid crystal molecules 111 of the liquid crystal layer 110, the liquid crystal molecules 111 of the liquid crystal layer 110 would be vertically aligned to liquid crystal molecules 111' indicated by a dotted line in FIG. 3. If the liquid crystal molecules 111 are aligned in the vertical direction in that way, transmittance is reduced to degrade the efficiency of the liquid crystal layer 110.

Thus, in the present exemplary embodiment, preferably, the voltage difference V2-V1 generated between the conductive layer 104 and the pixel array 112 is large enough to form a vertical field in the vertical direction at the liquid crystal layer 110 when viewed in FIG. 3, but within a range that does not allow the liquid crystal molecules to be aligned vertically. Thus, because the voltage difference between the conductive layer 104 and the pixel array 112 is within such a suitable range, the liquid crystal efficiency of the liquid crystal display panel 100 can be improved.

In more detail, Table 1 below shows the results of experimentation made by the applicant of the present invention. As noted in Table 1, compared with the related art liquid crystal display panel including a conductive layer (ITO) formed on a rear surface of a first substrate, when a conductive layer was formed on the front surface of the first substrate but only grounding was made, the liquid crystal efficiency was 57.32% in the case of L64 (when luminance is white), which is lower than the liquid crystal efficiency of 60.88% when the conductive layer is formed on the rear surface. Comparatively, in the exemplary embodiment of the present invention, when the conductive layer was formed on the front surface and 1.5V was applied, the liquid crystal efficiency was 60.44%, which is similar to the case where the conductive layer is formed on the rear surface.

TABLE 1

| | Normal (rear surface ITO) | Front ITO structure (GND) | Front ITO (1.5 V) |
|---|---|---|---|
| Liquid crystal efficiency (L0) | 0% | 0% | 0% |
| Liquid crystal efficiency L32 | 18.78% | 18.6% | 18.84% |
| Liquid crystal efficiency L64 | 60.88% | 57.32% | 60.44% |

That is, in the liquid crystal display panel 100 according to an exemplary embodiment of the present invention, a certain voltage is applied to the conductive layer 104 such that the liquid crystal efficiency is not degraded when the liquid crystal molecules 111 of the liquid crystal layer 110 are vertically aligned due to the voltage difference between the conductive layer 104 formed on the front surface of the first substrate 102 and the pixel array 112 formed on the second substrate 114, and in this case, the voltage difference between the conductive layer 104 and the pixel array 112 does not exceed the threshold voltage, namely, a minimum voltage required for the vertical field applied to the liquid crystal layer 110 to vertically align the liquid crystal molecules 111, thereby preventing degradation of the liquid crystal efficiency of the liquid crystal display panel 100.

A method for forming the liquid crystal display panel 100 configured as described above will now be described.

Figure 4:
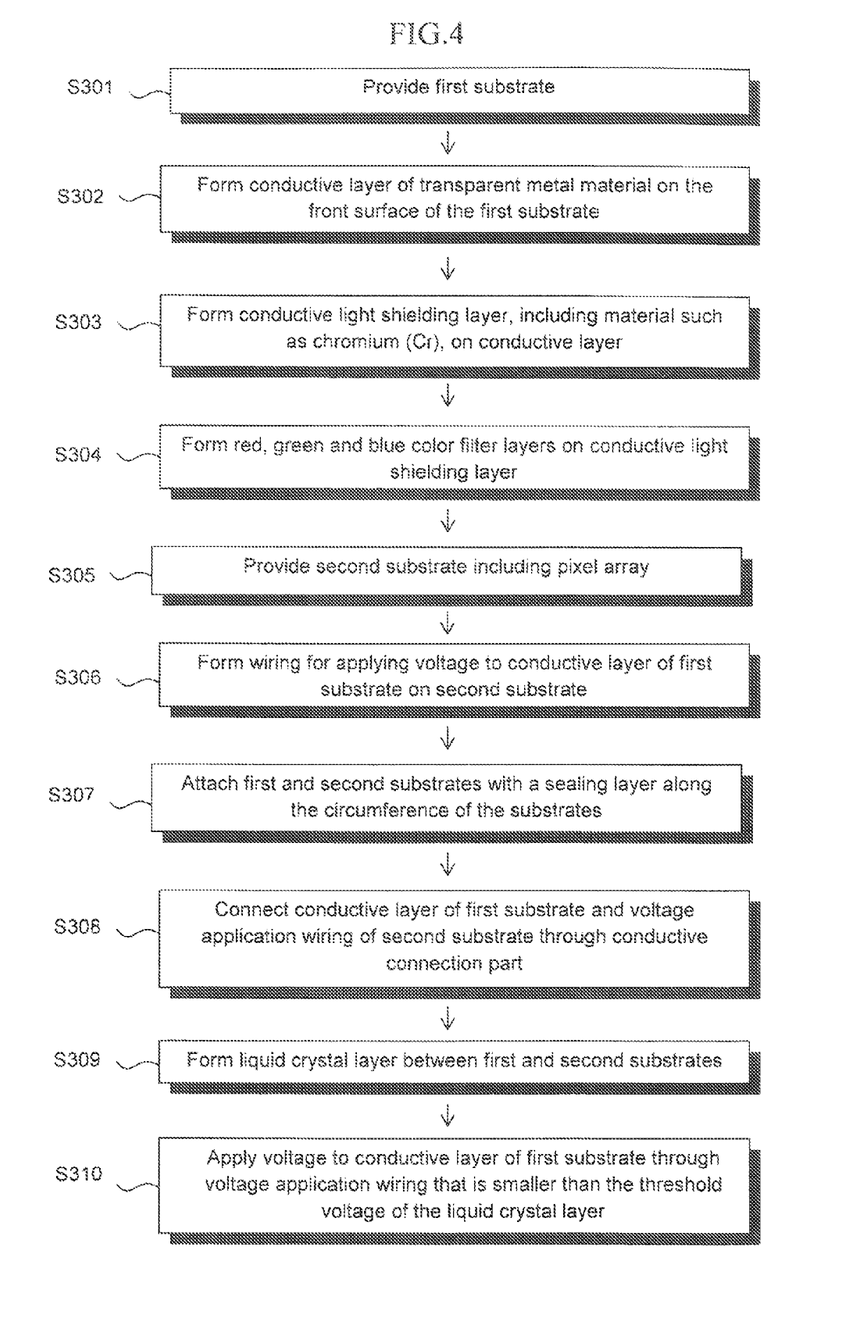
FIG. 4 is a flowchart illustrating the process of manufacturing a liquid crystal display panel according to an exemplary embodiment of the present invention.

FIG. 4 is a flowchart illustrating the process of manufacturing a liquid crystal display panel according to an exemplary embodiment of the present invention.

With reference to FIG. 4, first, the first substrate is provided (S301), and the conductive layer is formed with a transparent metal material on the front surface of the first substrate through a deposition process such as sputtering or the like (S302).

The transparent metal material may include indium tin oxide (ITO), tin oxide (TO), indium zinc oxide (IZO), indium tin zinc oxide (ITZO), and the like.

Next, the conductive light shielding layer including a metal material such as chromium (Cr) is formed on the conductive layer (S303). In this case, the conductive to light shielding layer may be formed by depositing a chromium oxide (CrOx) film on the first substrate and then performing photoresist and etching processes thereon.

Then, a red resin is deposited on the first substrate with the conductive light shielding layer formed thereon, on which a photolithography process using a mask, an etching process, and a baking process for hardening are performed to pattern the red resin to form a red color filter (R). Thereafter, a green color filter and a blue color filter are formed on the upper substrate 102 with the red color filter (R) formed thereon, in the same manner, to form RGB color filter layers (S304).

An overcoat material is then deposited on the entire surface of the first substrate with the RGB color filters formed thereon to form the overcoat layer.

The second substrate is provided through a process separately performed from the process of providing the first substrate (S305). At this time, a thin film pattern including a thin film transistor (TFT), a gate line, a data line, a common electrode, a pixel electrode, and the like, is formed at a portion (i.e., a display area) of the second substrate.

Meanwhile, in the process of forming the thin film pattern of the second substrate, a wiring pattern for applying a voltage to the conductive layer of the first substrate is formed (S306). In this case, the wiring pattern is electrically short-circuited with the wiring of the pixel array to which a driving voltage is applied.

Thereafter, the first and second substrates are attached (S307). The process of attaching the first and second substrates includes a process of forming a sealing layer along the circumference of the first and second substrates in order to allow the liquid crystal layer to be formed between the first and second substrates.

In this case, in the process of attaching the first and second substrates, the conductive layer of the first substrate and the voltage application wiring of the second substrate are electrically connected (S308). To this end, the conductive connection part is formed between the first and second substrates.

Subsequently, liquid crystal is injected between the first and second substrates to form the liquid crystal layer (S309).

After the formation of the liquid crystal layer is completed, a certain voltage V1 that is different from the voltage V2 applied to the pixel array is applied to the conductive layer (S310). In this case, a driving source for driving the liquid crystal display panel may be used as a voltage source for applying the voltage to the conductive layer.

In this case, as described above, as for the voltage applied to the conductive layer from the voltage source, a voltage difference between the voltage applied to the conductive layer and the voltage applied to the pixel array is adjusted to be smaller than the threshold voltage that does not allow the liquid crystal molecules of the liquid crystal layer to be vertically aligned.

The configuration of the liquid crystal display panel according to the present exemplary embodiment can be applied to a fringe-field switching (FFS) mode and a plane to line switching (PLS) mode as well as to the in-plane switching (IPS) mode.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of Symbols>

| 100 | liquid crystal display panel | 102 | first substrate |
|---|---|---|---|
| 104 | conductive layer | 106 | color filter |
| 108 | overcoat layer | 110 | liquid crystal layer |
| 111 | liquid crystal molecules | 112 | pixel array |
| 114 | second substrate | 116 | black matrix |
| 118 | ITO voltage application wiring | 119 | pixel array wiring |
| 120 | conductive connection part | 130 | ITO voltage source |

What is claimed is:

1. A liquid crystal display panel comprising:
    a first substrate comprising a conductive layer on one surface thereof;
    a color filter layer comprising a plurality of color filters on the conductive layer;
    a conductive light shielding layer between the plurality of color filters;
    a second substrate comprising a pixel array disposed on one surface thereof; and
    a liquid crystal layer between the conductive light shielding layer and the pixel array,
    wherein the conductive light shielding layer is electrically short-circuited with the pixel array and wherein the conductive layer does not have a pattern.

2. The panel of claim 1, wherein the pixel array comprises a thin film transistor (TFT), a pixel electrode, and a common electrode.

3. The panel of claim 1, further comprising:
    an overcoat layer disposed on a portion of the color filter layer.

4. The panel of claim 1, wherein a voltage is applied to the conductive layer, and the difference between the voltage applied to the conductive layer and a voltage applied to the pixel array is less than the threshold voltage of the liquid crystal layer.

5. The panel of claim 1, wherein the conductive light shielding layer contains chromium (Cr).

6. The panel of claim 1, wherein voltage application wiring is disposed on the second substrate, in order to apply a voltage to the conductive layer of the first substrate, and the voltage application wiring is electrically short-circuited with wiring of the pixel array.

7. The panel of claim 6, wherein a conductive connection part is disposed between the first and second substrates and electrically connects the voltage application wiring and the conductive layer.

8. The panel of claim 7, wherein the conductive connection part comprises a sealing material.

9. A method for forming a liquid crystal display panel, the method comprising:
    providing a first substrate with a conductive layer having no pattern formed on a front surface thereof;
    forming a conductive light shielding layer on a portion of the conductive layer; and forming a color filter layer comprising a plurality of color filters on the conductive light shielding layer wherein the conductive light shielding layer between the plurality of color filters;

providing a second substrate with voltage application wiring formed thereon to apply a voltage to the conductive layer of the first substrate wherein providing the second substrate comprises forming a pixel array on the second substrate wherein the pixel array is formed to be electrically short-circuited with the conductive light shielding layer;

attaching the first and second substrates;

electrically connecting the conductive layer of the first substrate and the voltage application wiring of the second substrate;

forming a liquid crystal layer between the conductive light shielding layer and the pixel array; and applying a voltage to the conductive layer of the first substrate.

10. The method of claim 9, wherein electrically connecting the conductive layer of the first substrate and the voltage application wiring of the second substrate comprises forming a conductive connection part between the first and second substrates.

11. The method of claim 9, wherein the difference between a voltage applied to the conductive layer and a voltage applied to the pixel array is less than the threshold voltage of the liquid crystal layer.

* * * * *